United States Patent
Meijer et al.

(10) Patent No.: US 7,694,274 B2
(45) Date of Patent: Apr. 6, 2010

(54) DYNAMICALLY TYPED UNSAFE VARIANCE

(75) Inventors: Erik Meijer, Mercer Island, WA (US); Anders Hejlsberg, Seattle, WA (US); Matthew J. Warren, Redmond, WA (US); Luca Bolognese, Redmond, WA (US); Peter A. Hallam, Seattle, WA (US); Gary S. Katzenberger, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 11/193,692

(22) Filed: Jul. 29, 2005

(65) Prior Publication Data

US 2007/0028210 A1 Feb. 1, 2007

(51) Int. Cl.
G06F 9/44 (2006.01)
G06F 9/45 (2006.01)

(52) U.S. Cl. .................. 717/114; 717/126; 717/140; 717/141; 709/203; 709/224; 709/226

(58) Field of Classification Search .................. None
See application file for complete search history.

(56) References Cited

OTHER PUBLICATIONS

Rick Byers, The CLR, Programming Languages, and Developer Productivity, http://blogs.msdn.com/rmbyers/archive/2005/02.aspx, Feb. 2005.*
Narayana Surapaneni, IL "The Language of CLR"—A Platform for Cross-Language, Jun. 28, 2001, http://www.c-sharpcorner.com/UploadFile/nrsurapaneni/ILtheLangOfCLRbyNRSl2222005040956AM/ILtheLangOfCLRbyNRS.aspx.*
Mads Torgersen, et al., Adding Wildcards to the Java Programming Language, SAC '04, Mar. 14-17, 2004, Nicosia, Cyprus.
Rick Byers, The CLR, Programming Languages, and Developer Productivity, http://blogs.msdn.com/rmbyers/archive/2005/02.aspx, Feb. 2005, last viewed Jul. 13, 2005.
Juval Lowy, An Introduction to C# Generics, http://msdn.microsoft.com/library/en-us/dnvs05/html/csharp_generics.asp?frame=true, Updated Jan. 2005, last viewed Jul. 13, 2005.

* cited by examiner

*Primary Examiner*—Hyung S Sough
*Assistant Examiner*—Kimberly Jordan
(74) *Attorney, Agent, or Firm*—Workman Nydegger

(57) ABSTRACT

A program execution engine that facilitates generic type variance verification is provided. The execution engine receives a program executable in the form of intermediate language (IL). The program executable can be based on code that includes expression(s) with generic type(s) which have been identified as requiring variance verification (e.g., covariance and/or contra-variance). The execution engine includes a variance verification component that dynamically determines whether value(s) associated with the generic type(s) identified as requiring variance verification comply with the particular variance verification requirement. The variance verification component can provide error information (e.g., throw an exception), if the specified variance is not safely compliant. Variance verification can be based on static checking which places the burden on a source language compiler to emit the run-time checks in intermediate language (IL), if run-time checked variance is required. Additionally, language(s) that do not support variance can treat generic type(s) as non-variant.

11 Claims, 7 Drawing Sheets

DYNAMICALLY TYPED UNSAFE VARIANCE

BACKGROUND

In many statically typed object-oriented languages, arrays are covariant. This means that a value of type T[ ] can be passed/assigned to a value of type S[ ] whenever there is an implicit reference conversion from type T to type S. Assuming an implicit reference conversion from string to object exists, the following array assignment is valid:

string[ ] ss=new string[ ] {"Hello", "World"};
object[ ] os=ss;

While this is extremely convenient and intuitive for programmers, it requires that each write-access of a value x to a covariant array xs performs a dynamic type-check to ensure that there is an implicit reference conversion from the dynamic type of the value x to the dynamic element type of the array xs. Without this runtime check it would be possible to create an array whose values do not conform to the expected type of the array resulting in potentially unsafe and/or unknown consequences.

Continuing with this example, it is incorrect to insert a Button element into the array os, since that would mean that the array ss now has both string and Button elements (since ss and os both point to the same array instance). The following assignment thus throws a run-time exception:

os[0]=new Button( );
string s=ss[0];

Before the advent of generics, arrays were the only "generic types" available. Generic types form a powerful and ubiquitous aspect of object-oriented programming. Generic types, also known as parameterized types, define formal constructs of some type(s) (e.g., a list with elements of some type, a queue with elements of some type, a stack with elements of some type . . . ). This "some type(s)" is referred to in the art as the parameter(s) of generic types. A common notation for generic types is List<T>, where T represents the type parameter and List is the generic type. When a concrete type is used as a type parameter of a generic type, the resulting type is commonly referred to as generic instantiation or constructed type (e.g., a stack of integer values Stack<int>, list of strings List<string>, queue of floating-point values Queue <float> . . . ). Many programming languages (e.g., C# and Java) require generic type to be invariant which prohibits, for example, passing a List<string> where a List<object> is expected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A program execution engine that facilitates verification of generic type variance is provided. As noted previously, many programming languages (e.g., C# and Java) require generic type to be invariant which prohibits, for example, passing a List<string> where a List<object> is expected. While this approach is safe, it is inconvenient and counterintuitive for programmers.

The execution engine can be employed, for example, in a language runtime environment that does not use erasure for generics. The execution engine includes an input component that receives a program executable in the form of an intermediate language (IL) representation. The program executable can be based on code that includes expression(s) with generic type(s) which have been identified as requiring variance verification (e.g., covariance and/or contra-variance).

"Covariance" refers to the existence of an implicit reference conversion from generic type (e.g., Cell<S>) to another generic type (e.g., Cell<T>) provided there is an implicit reference conversion from S to T. For example, a Cell<string> can be assigned to a Cell<object> provided there is an implicit reference conversion from S to T. "Contra-variance" refers to the existence of an implicit reference conversion from generic type (e.g., Cell<T>) to another generic type (e.g., Cell <S>) provided there is an implicit reference conversion from S to T (e.g., comparing contra-variance to covariance there is a reversal in the direction of the conversion).

The execution engine further includes a variance verification component that dynamically determines whether value(s) associated with the generic type(s) identified as requiring variance verification comply with the particular variance verification requirement. The variance verification component can provide error information (e.g., throw an exception), if the specified variance is not safely compliant The variance verification component facilitates variance (e.g., covariance and/or contra-variance) in a language runtime generics type system. The variance verification can be based on static checking which places the burden on a source language compiler to emit the run-time checks in intermediate language (IL), if run-time checked variance is required. Additionally, language(s) that do not support variance can treat generic type(s) as non-variant.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
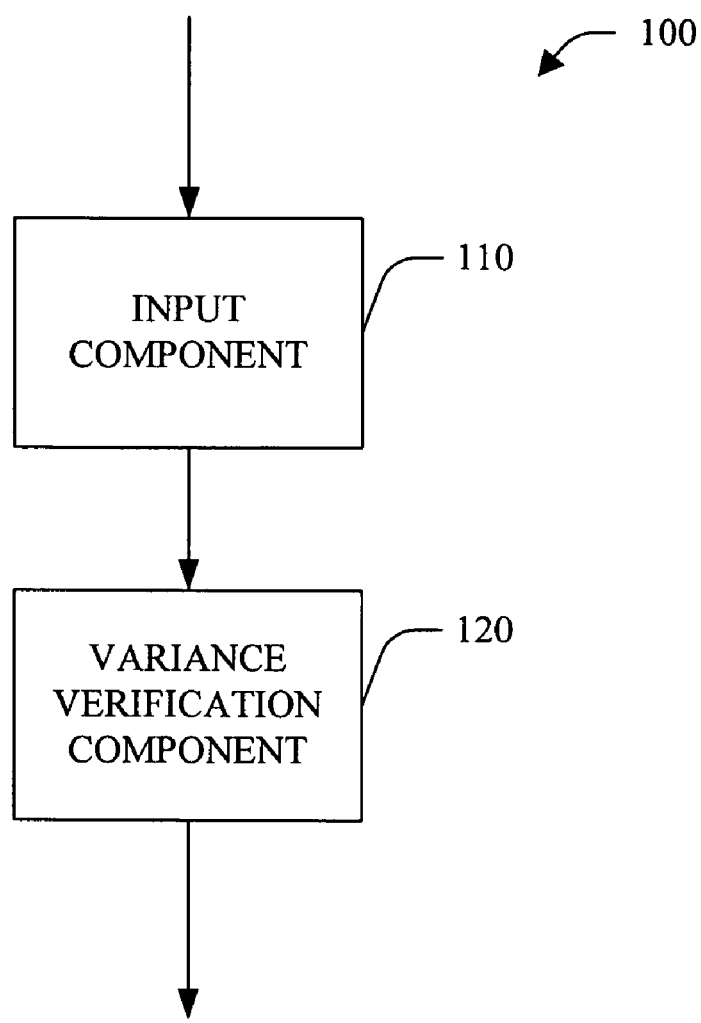
FIG. 1 is a block diagram of an execution engine.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, an execution engine 100 is illustrated. The engine 100 can be employed, for example, in a language runtime environment that does not use erasure for generics. "Erasure" refers to environment(s) in which a compiler compiles away generic code by mapping it onto non-generic code where basically all type variables are replaced by their bounds.

The execution engine 100 includes an input component 110 that receives a program executable in the form of an intermediate language (IL) representation. The program executable can be based on code that includes expression(s) with generic type(s) which have been identified as requiring variance verification (e.g., covariance and/or contra-variance), as discussed below. The execution engine 100 further includes a variance verification component 120 that dynamically determines whether value(s) associated with the generic type(s) identified as requiring variance verification comply with the particular variance verification requirement. Thus, the execution engine 100 can support compilation of run-time checked variance.

The variance verification component 110 facilitates variance (e.g., covariance and/or contra-variance) in a language runtime generics type system. Further, variance can be implemented on generic interface(s) and/or generic delegate(s). The variance verification is based on static checking which places the burden on a source language compiler (not shown) to emit the run-time checks in intermediate language (IL), if run-time checked variance is required. Additionally, language(s) that do not support variance can treat generic type(s) as non-variant.

Figure 2:
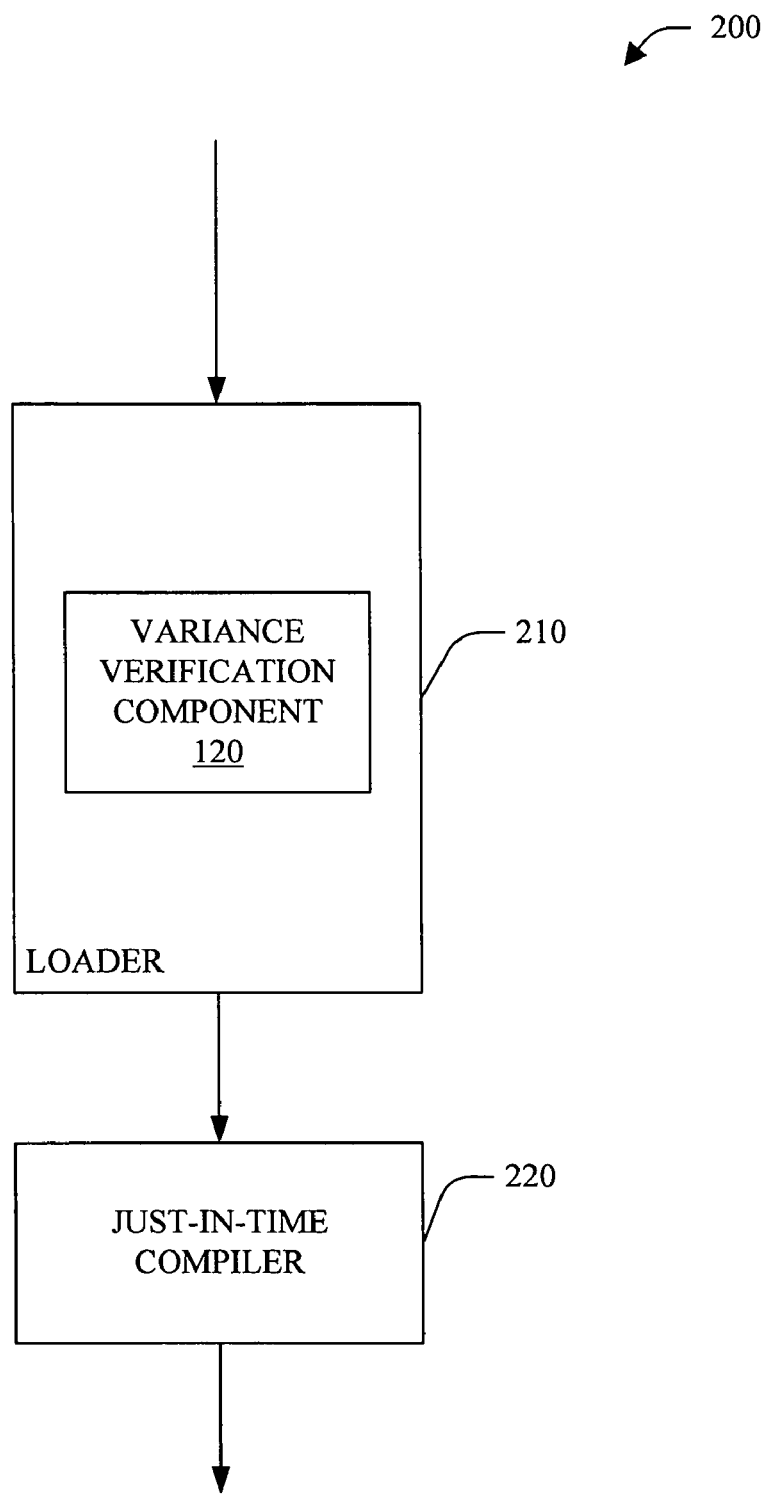
FIG. 2 is a block diagram of an execution environment.

Referring briefly to FIG. 2, an execution environment 200 is illustrated. In this example, the variance verification component 120 is a component of a loader 210 that can, for example, load class(es) etc. The environment 200 further includes a just-in-time (JIT) compiler 220 that compiles IL received from the loader into native machine instructions for a target processor.

Returning to FIG. 1, in one example, variance annotation(s) are included at type declarations. An optional source language compiler emits run-time checks in IL which is provided to the engine 100. Thereafter, type-checks are performed by the variance verification component 120, for example, on (1) read(s) for contra-variance and/or (2) write(s) for covariance. The annotations can include, for example, a "+" preceding the type to identify covariance verification and/or a "−" preceding the type to identify contra-variance verification.

The example below declares a co-variant type Cell<+T> that has a public field of type T:

```
class Cell<+T>
{
    public T Value;
}
```

Example 1

Generally, "covariance" refers to the existence of an implicit reference conversion from generic type (e.g., Cell<S>) to another generic type (e.g., Cell<T>) provided there is an implicit reference conversion from S to T. For example, a Cell<string> can be assigned to a Cell<object> provided there is an implicit reference conversion from S to T.

For example, consider a cell cT of static type Cell<T>. At runtime, when assigning Ct.Value=e, the execution engine 100, and, more particularly, the variance verification component 120 checks to ensure that there is an implicit reference conversion from the dynamic type of e to the dynamic element type of cT to maintain safety (e.g., _value.GetType( ).IsAssignableFrom(value.GetType( ))). If an implicit conversion does not exist, the variance verification component 120 provides error information (e.g., throws a run-time exception).

Continuing with the declaration of Example 1,
Cell<string>cs=new Cell<string>( ); dynamic type of cs is Cell<string>
Cell<object>co=cs; // dynamic type of co is Cell<string>
object b=new Button( );
co.Value=b;

Example 2

When presented with IL associated with the code of Example 2, the variance verification component 120 generates an exception since the dynamic type of co.Value is "string" and the fourth line of the code attempts to assign a value "b" which has a dynamic type of "button" (e.g., no implicit reference conversion from "button" to "string"). In one example, the variance verification component 120 performs a check each time an assignment is performed on a variable whose type is marked as covariant.

Continuing with this example, IL generated from the assignment "co.Value=b" follows:
ldloc co
ldloc b
stfld !0 Cell'1<object>::Value In this example, the Cell "co" is first pushed on the stack ("co" has dynamic type Cell<string>). Next, the Button "b" is pushed on the stack. Finally, the "stfld" instruction is called to store "b" in the field identified as !0 Cell'1<object>::Value of co. The !0 refers to the first type argument of Cell'1<object>, that is, it is bound to object in this case, which reflects the static type of the Value field of co.

Since the dynamic type of co is actually Cell'1<string>, the assignment would be unsafe, and the execution engine 100 checks that the dynamic type of the value b it is trying to store in the field (which is button) has an implicit reference conversion to the first type argument of the dynamic type of "co" (which is string). In this example, the variance verification component 120 provides error information (e.g., throws an exception) as there is no implicit reference conversion from the dynamic type of the value attempted to be assigned to the first type argument of the dynamic type of "co".

With respect to covariance, the variance verification component 120 performs checks on writes—there is no problem to read from a Cell<object> when the dynamic type is Cell<string> since it is known statically that what gets returned is a subtype of object.

Additionally and/or alternatively, the variance verification component 120 can employed to check contra-variant type(s), for example:

```
class Cell<-T>
{
   public T Value;
}
```

As used herein, "contra-variance" refers to the existence of an implicit reference conversion from generic type (e.g., Cell<T>) to another generic type (e.g., Cell <S>) provided there is an implicit reference conversion from S to T. Comparing contra-variance to covariance discussed previously, there is a reversal in the direction of the conversion.

With respect to contra-variance, care must be taken when reading a Value field of a cell "c" with static type Cell<S>. In this instance, the variance verification component 120 checks that there is an implicit reference conversion from the dynamic element type of "c" to the type of the expected result to maintain type safety. For example:

Cell<object> co=new Cell<object>( );
Cell<string> cs=co;
string s=cs.Value;

Example 3

In this example, the variance verification component 120 throws an exception since an "object" type would be returned on a static type of "string".

Continuing with this example, IL generated from the assignment "s=cs.Value" follows:

ldloc cs
ldfld !0 Cell'1<string>::Value
stloc s

In this example, the cell cs is first pushed onto the stack (which has dynamic type Cell<object>). Then the ldfld instruction is called to push the field !0 Cell'1<string>::Value onto the stack. In this case !0 is bound to string, but since the dynamic type of cs is Cell'<object>, the variance verification component 120 checks to ensure that the dynamic type of the first type argument of cs (which is object) has an implicit reference conversion to the promised static return type of the filed access which is string. Since an "object" type would be returned on a static type of "string", the variance verification component 120 throws an exception.

With respect to contra-variance, the variance verification component 120 performs checks on reads—there is no problem to write to a Cell<string> when the dynamic type is Cell<object> because it is known statically that what is written is a subtype of what is expected.

Those skilled in the art will recognize that the rules discussed above with respect to covariance and contra-variance of generic types can be extended to method(s) on class(es) as well. For example,

```
class Covariant<+S>
{
   public void Write(S s){...}
   public S Read( ){...}
}
class Contravariant<-S>
{
   public void Write(S s){...}
   public S Read( ){...}
}
```

If a type parameter is marked as co-variant then methods that take an argument that mentions S must perform a dynamic check via the variance verification component 120 to ensure that the dynamic type of the co-variant type parameter in that argument can be converted using an implicit reference conversion to the dynamic type of the dynamic type of the covariant type parameter in the receiver. That is, the dynamic type of the arguments must be compatible with the "dynamic type" of the method attempted to be called. For example:

Covariant<string> cs=new Covariant<string>( );
Covariant<object> co=cs;
co.Write(new Button( ));

The dynamic type of "cs" and "co" is covariant<string>. In the third line, an attempt is made to pass "new Button( )" to the write method of co (dynamic type is covariant<string)— the variance verification component 120 recognizes the unsafe condition and throws an exception.

Similarly, if a type parameter S is marked contra-variant, then methods whose return type mentions S must do a dynamic check via the variance verification component 120 to ensure that the dynamic type of that type-parameter has an implicit reference conversion to the static type of that type parameter in the receiver. That is, the "dynamic type" of the return type of the method being called is compatible with the static return type. For example:

Contravariant<object> co=new Contravariant<object>( );
Contravariant<string> cs=co;
string s=cs.Read( );

In this example, the dynamic type of "co" and "cs" is Contravariant<object>. In the third line, an attempt is made to employ the read method of cs (dynamic type is object Read( )), but static type is string Read( )) and assign the return value to a string. The variance verification component 120 recognizes the unsafe condition and throws an exception.

Additionally, these mechanisms also work when annotating types at use-site, for example, class Cell<T>{ } can be declared and a Cell<+string> or a Cell<-object> can be created. In the latter case, variance annotations can be tracked separately as a "type" with the following rules added:

There is an implicit reference conversion from C<+S> to C<+T>, provided there is an implicit reference conversion from S to T.

There is an implicit reference conversion from C<+T> to C<T>.

There is an implicit reference conversion from C<-T> to C<-S>, provided there is an implicit reference conversion from S to T.

There is an implicit reference conversion from C<-T> to C<T>.

Those skilled in the art will recognize that variance can be extended to multiple type parameters (e.g., for "function" types), for example:

```
interface IConverter<-T,+U>
{
    U Convert(T x);
}
delegate U Function<-T,+U>(T arg);
```

In this example, a value of type IConverter<object, string> can be assigned to a variable of type IConverter<string, object>, and, a value of type Function<object, string> can be assigned to Function<string, object>.

Additionally, in one example, the language run-time environment employs a metadata table which stores information regarding generic types used as parameters. Variance information can be stored in entries of this metadata table, for example, a flags column in can be used to specify variance:

```
typedef enum CorGenericParamAttr
{
    gpVarianceMask = 0x0003,
    gpNonVariant = 0x0000,
    gpCovariant = 0x0001,
    gpContravariant = 0x0002
}
```

Figure 3:
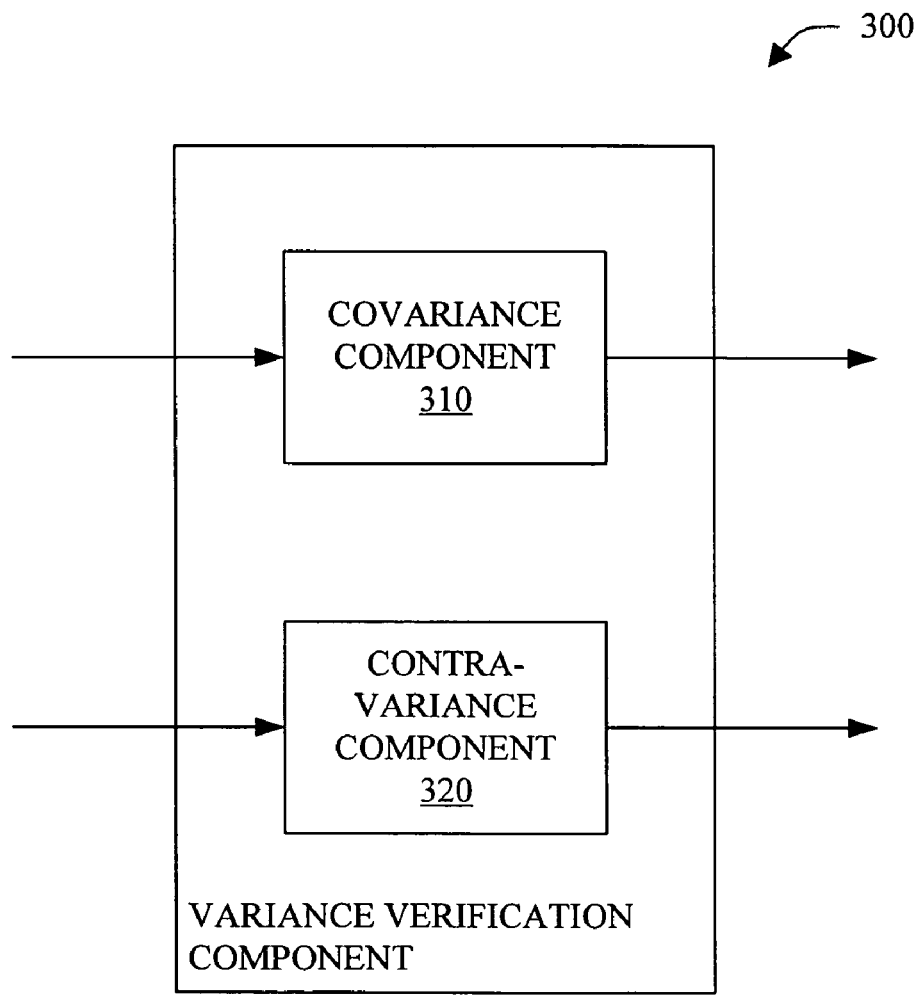
FIG. 3 is a block diagram of a variance verification component.

Referring briefly to FIG. 3, a variance verification component 300 is illustrated. In this example, the variance verification component 300 includes a covariance component 310 that dynamically determines whether value(s) associated with generic type(s) identified as requiring covariance verification, if any, are safe. The variance verification component 300 further includes a contra-variance component 320 that dynamically determines whether value(s) associated with generic type(s) identified as requiring contra-variance verification, if any, are safe.

It is to be appreciated that the execution engine 100, the input component 110, the variance verification component 120, the execution environment 200, the loader 210, the just-in-time compiler 220, variance verification component 300, the covariance component 310 and/or the contra-variance component 320 can be computer components as that term is defined herein.

Turning briefly to FIGS. 4-7, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
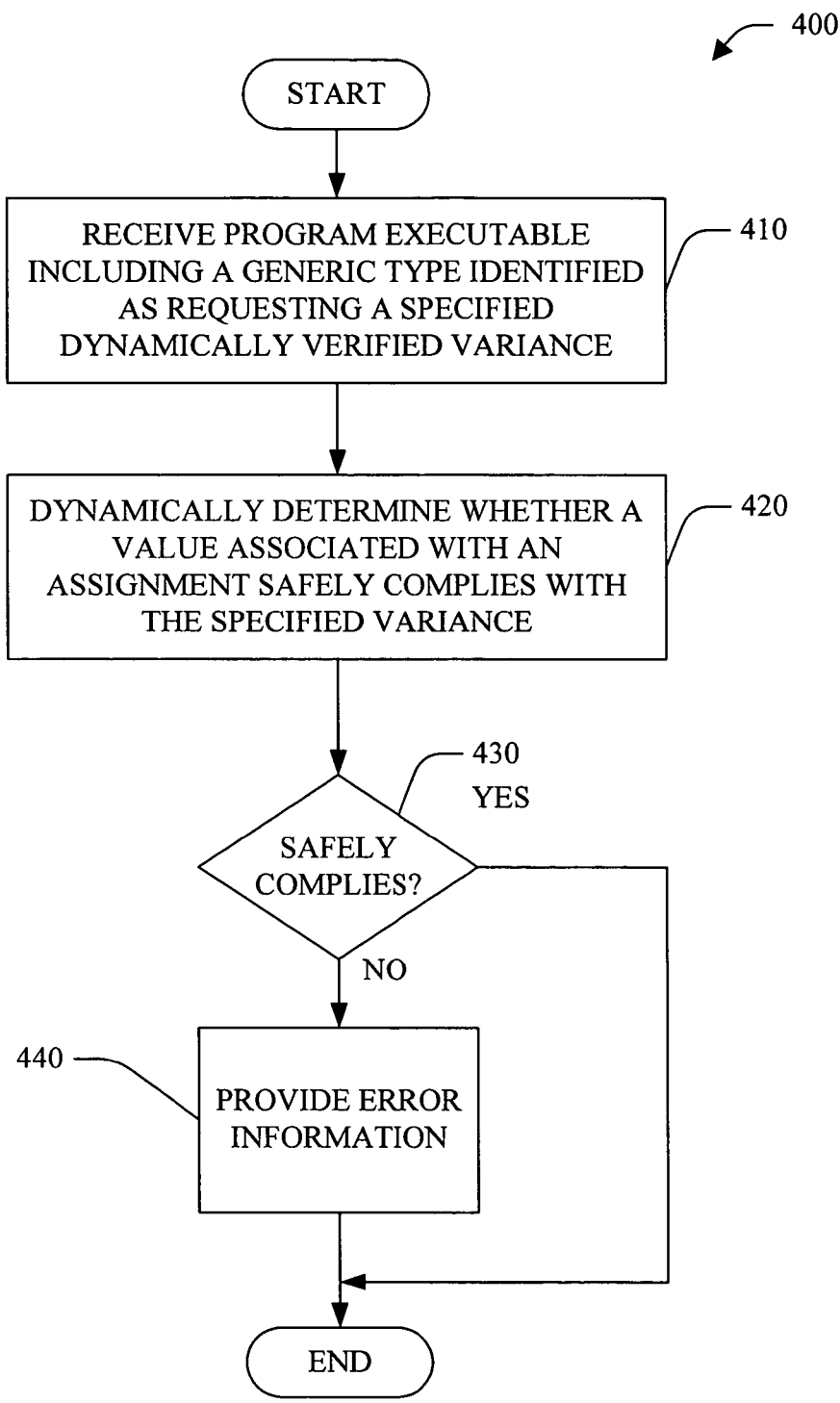
FIG. 4 is a flow chart of a method that facilitates dynamically verified generic type variance.

Referring to FIG. 4, a method that facilitates dynamically verified generic type variance 400 is illustrated. At 410, a program executable (e.g., in IL format) including a generic type identified as requesting a specified dynamically verified variance (e.g., covariance and/or contra-variance) is received. At 420, it is dynamically determined (e.g., in run-time environment) whether a value associated with an assignment safely complies with the specified variance. For example, the dynamic check can be performed on "writes" when covariance verification if specified and/or on "reads" when contra-variance verification is specified.

At 430, a determination is made as to whether the assignment safely complies with the specified variance. If the determination at 430 is YES, no further processing occurs. If the determination at 430 is NO, at 440, error information is provided (e.g., an exception is thrown).

Figure 5:
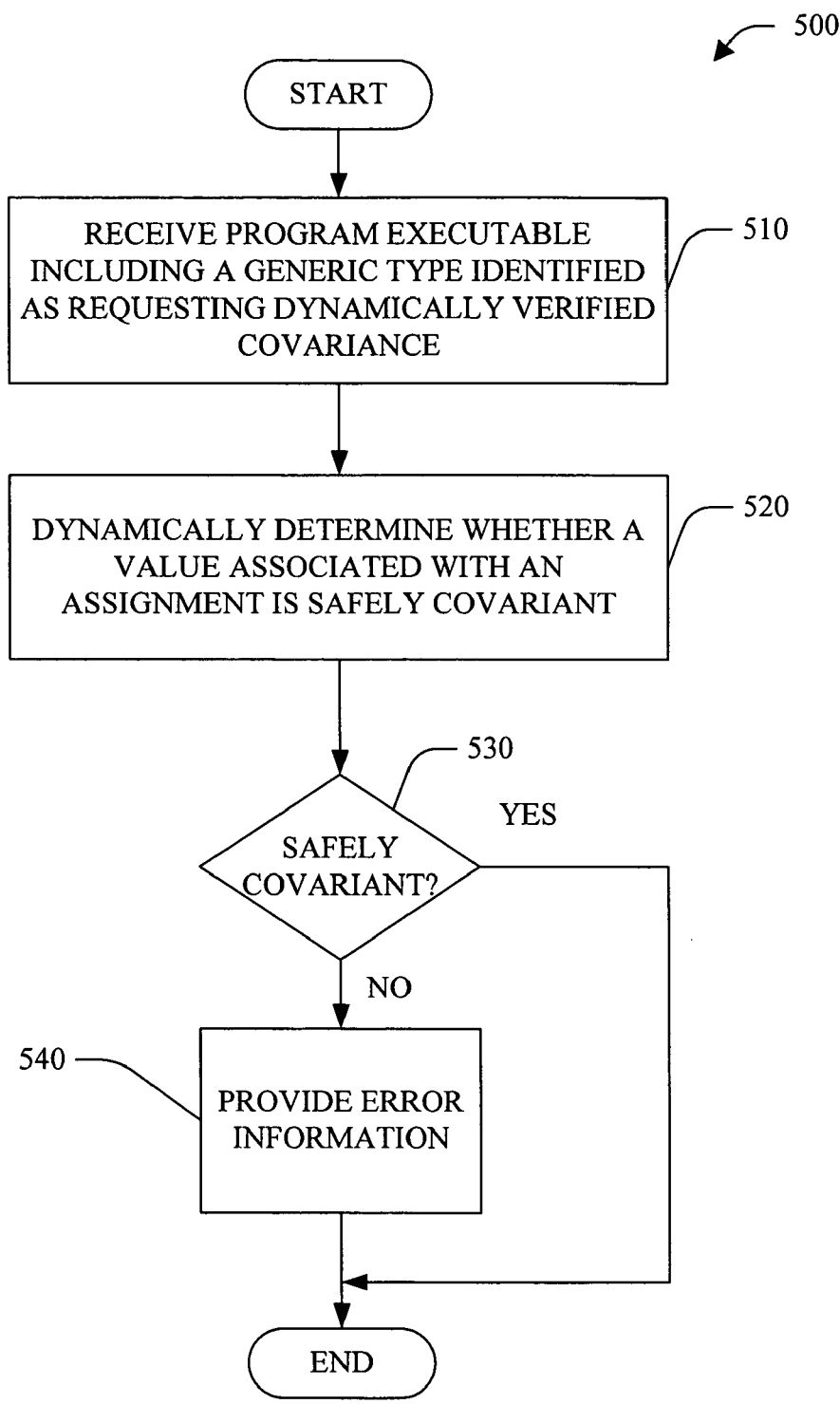
FIG. 5 is a flow chart of a method that facilitates dynamically verified generic type covariance.

Turning to FIG. 5, a method that facilitates dynamically verified generic type covariance 500 is illustrated. At 510, a program executable (e.g., in IL format) including a generic type identified as requesting a specified dynamically verified covariance is received. At 520, it is dynamically determined (e.g., in run-time environment) whether a value associated with an assignment (e.g., write) is safely covariant.

At 530, a determination is made as to whether the assignment is safely covariant. If the determination at 530 is YES, no further processing occurs. If the determination at 530 is NO, at 540, error information is provided (e.g., an exception is thrown).

Figure 6:
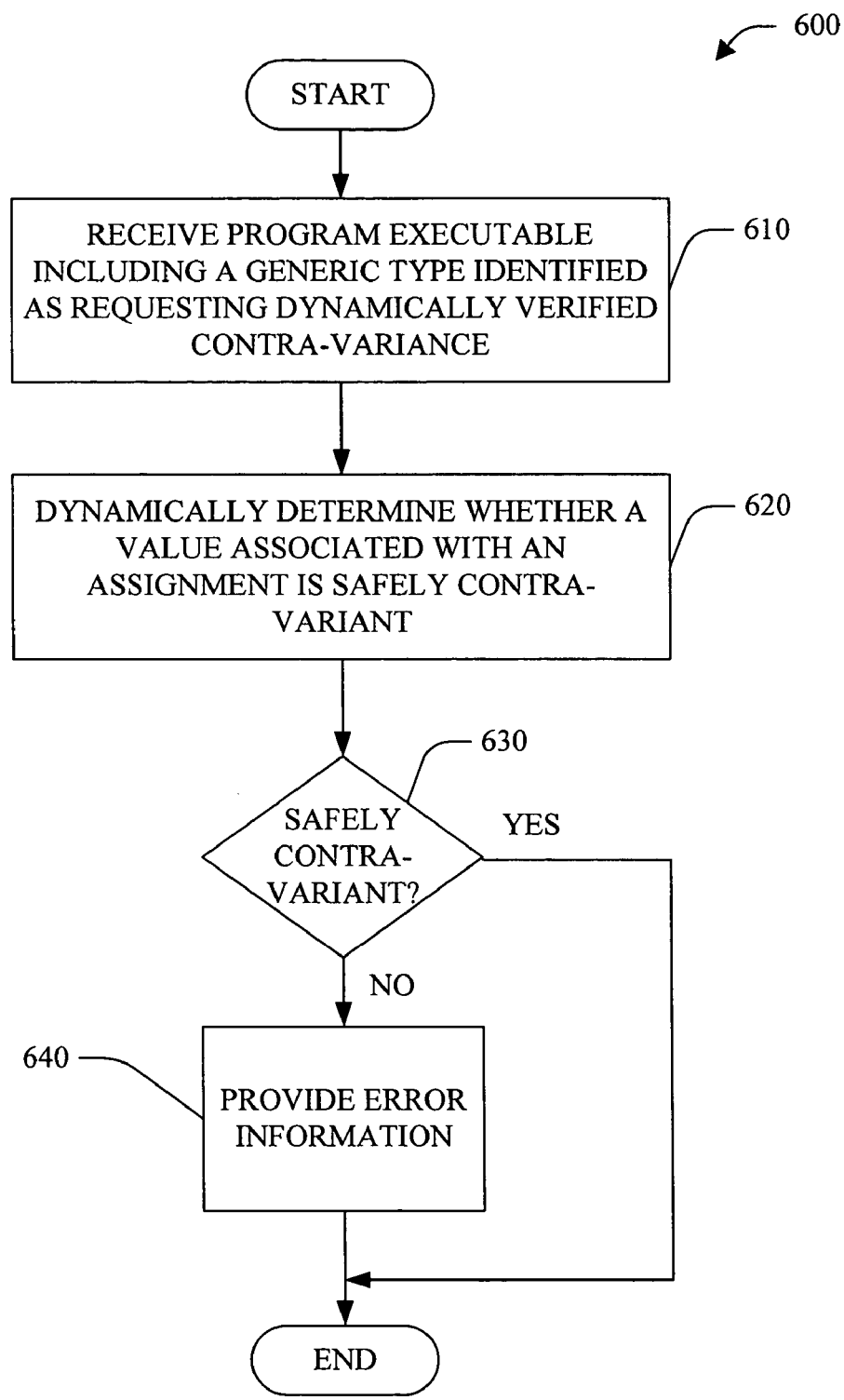
FIG. 6 is a flow chart of a method that facilitates dynamically verified generic type contra-variance.

Next, referring to FIG. 6, a method that facilitates dynamically verified generic type contra-variance 600 is illustrated. At 610, a program executable (e.g., in IL format) including a generic type identified as requesting a specified dynamically verified covariance is received. At 620, it is dynamically determined (e.g., in run-time environment) whether a value associated with an assignment (e.g., read) is safely contra-variant.

At 630, a determination is made as to whether the assignment is safely contra-variant. If the determination at 630 is YES, no further processing occurs. If the determination at 630 is NO, at 640, error information is provided (e.g., an exception is thrown).

Figure 7:
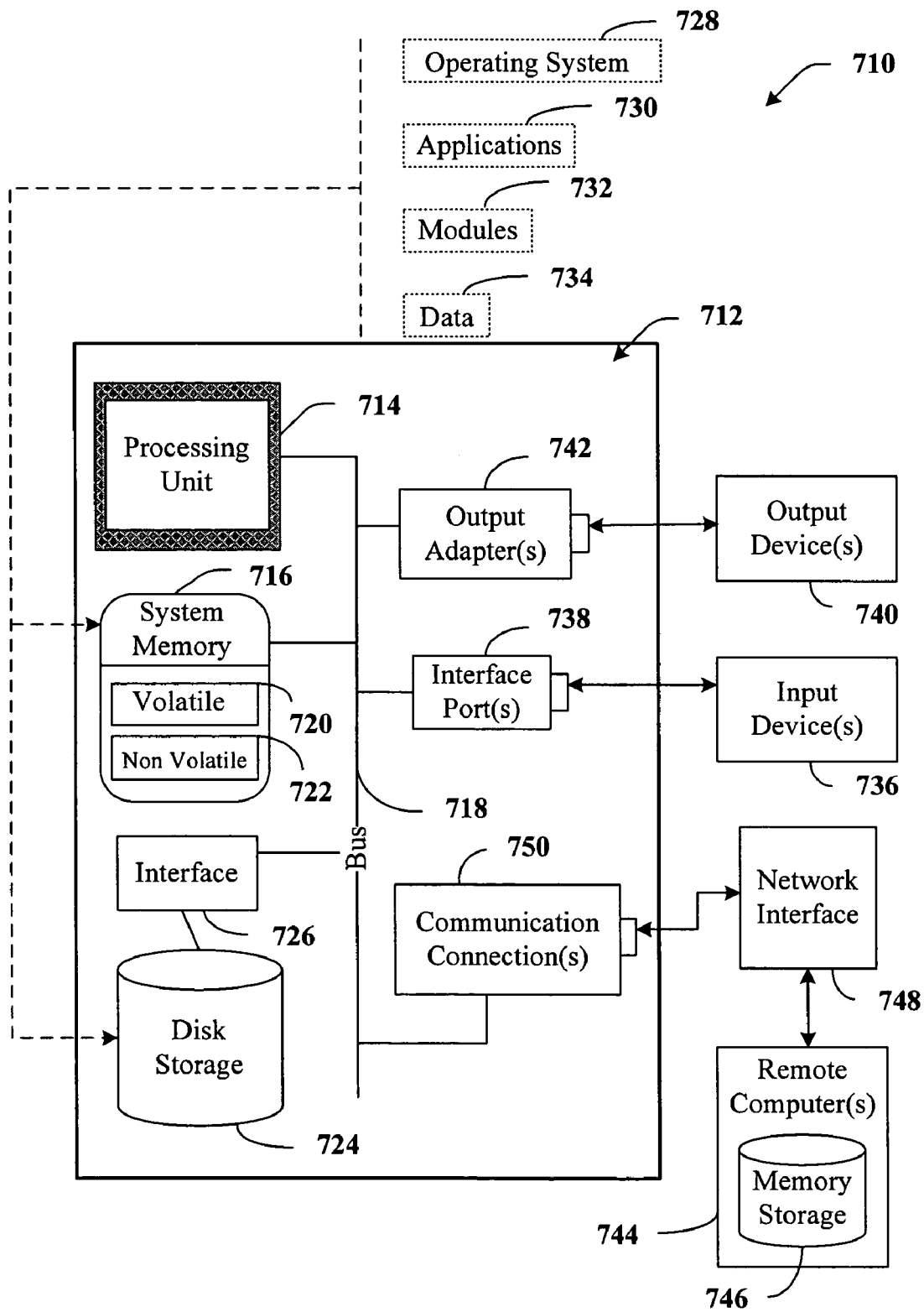
FIG. 7 illustrates an example operating environment.

In order to provide additional context for various aspects of the claimed subject matter, FIG. 7 and the following discussion are intended to provide a brief, general description of a suitable operating environment 710. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. At a computer system, the computer system including:
one or more processors;
system memory; and
one or more computer storage media having stored thereon computer executable instructions representing an execution engine, the execution comprising:
  an input component that receives a program executable including intermediate language instructions, the intermediate language instructions including run-time checks, the run-time checks having been emitted into the intermediate language instructions by a source language compiler during compilation from source language instructions into the intermediate language instructions, the run-time checks for verifying compliance with variance requirements of the source language during execution of the intermediate language instructions in order to maintain type safety, the run-time checks including intermediate language instructions for checking: (i) verifying covariance between different generic types by checking for implicit reference conversions between different generic types of the source language during run-time in response to detecting that a write instruction is to be executed and (ii) verifying contra-variance between different generic types by checking for implicit reference conversions between different generic types of the source language during run-time in response to detecting that a read instruction is to be executed; and
  a variance verification component, wherein the variance verification component is configured to:
    verify compliance with covariance requirements for write instructions, including:
      detect that a write instruction is to be executed to convert a value from a first generic type to a second different generic type;
      prior to executing the write instruction, execute an emitted run-time check applicable to the write instruction to check for an implicit reference conversion from the first generic type to the second generic type;
      determine when there is not an implicit reference conversion from the first generic type to the second generic type from the results of the applicable run-time check; and
      provide error information related to the write instruction in response to determining that the implicit reference conversion does not exist; and
    verify compliance with contra-variance requirements for read instructions, including:
      detect that a read instruction is to be executed to convert a value from a third generic type to a fourth different generic type;
      prior to executing the read instruction, execute an emitted run-time check applicable to the read instruction to check for an implicit reference conversion from the third generic type to the fourth generic type;
      determine when there is not an implicit reference conversion from the third generic type to the fourth generic type from the results of the applicable run-time check; and
      provide error information related to the read instruction in response to determining that the implicit reference conversion does not exist.

2. The engine of claim 1, wherein variance verification is implemented on at least one of a generic interface, a generic delegate and a method on a class.

3. The engine of claim 1, an annotation associated with the variance verification includes a type declaration.

4. The engine of claim 3, the annotation identifying covariance verification.

5. The engine of claim 3, the annotation identifying contra-variance verification.

6. The engine of claim 1, the variance verification component performs a check each time an assignment is performed on a variable whose type is marked as covariant.

7. The engine of claim 1, further comprising a metadata table which stores information regarding generic types used as parameters, the table further comprising information associated with specified variance for a particular generic type.

8. At a computer system, the computer system including processor and system memory, the computer system including a just-in-time compiler for compiling intermediate language instructions into machine instructions targeted to the processor, a method for checking code for compliance with variance requirements at run-time, the method comprising:
  receiving intermediate language instructions, the intermediate language instructions including run-time checks, the run-time checks having been emitted into the intermediate language instructions by a source language compiler during compilation from source language instructions into the intermediate language instructions, the run-time checks for verifying compliance with variance requirements of the source language, during execution of the intermediate language instructions in order to maintain type safety, the run-time checks including intermediate language instructions for checking implicit reference conversions between different generic types of the source language during run-time in response to detecting that read or write instructions are to be executed;
  detecting that a specified instruction, selected from among: a read instruction or a write instruction, is to be executed by the processor to convert a value from a first generic type to a second different generic type;
  prior to the processor executing the specified instruction, the processor executing an emitted run-time check applicable to the specified instruction to check for an implicit reference conversion from the first generic type to the second generic type;
  determining that there is not an implicit reference conversion from the first generic type to the second generic type from the results of the applicable run-time check; and
  providing error information related to the specified instruction in response to the determination from the run-time check that the implicit reference conversion does not exist.

9. The method of claim 8, wherein the applicable run-time check is for checking covariance between the first generic type and the second generic type.

10. The method of claim 8, wherein the applicable run-time check is for checking contra-variance between the first generic type and the second generic type.

11. A computer program product for use at a computer system, the computer system including a processor and system memory, the computer system including a just-in-time compiler for compiling intermediate languages instructions into machine instructions targeted to the processor, the computer program product for implementing a method for checking code for compliance with variance requirements at run-time, the computer program product comprising one or more computer storage media having stored thereon computer-executable instructions that, when executed at the processor, cause the computer system to perform the method, including the following:

receive intermediate language instructions, the intermediate language instructions including run-time checks, the run-time checks having been emitted into the intermediate language instructions by a source language compiler during compilation from source language instructions into the intermediate language instructions, the run-time checks for verifying compliance with variance requirements of the source language during execution of the intermediate language instructions in order to maintain type safety, the run-time checks including intermediate language instructions for checking implicit reference conversions between different generic types of the source language during run-time in response to detecting that read or write instructions are to be executed;

detect that a specified instruction, selected from among: a read instruction or a write instruction, is to be executed to convert a value from a first generic type to a second different generic type;

prior to executing the specified instruction, execute an emitted run-time check applicable to the specified instruction to check for an implicit reference conversion from the first generic type to the second generic type;

determine that there is not an implicit reference conversion from the first generic type to the second generic type from the results of the applicable run-time check; and provide error information related to the specified instruction in response to the determination from the run-time check that the implicit reference conversion does not exist.

\* \* \* \* \*